Patented Oct. 25, 1932

1,884,899

UNITED STATES PATENT OFFICE

EVERETTE I. SOLLMANN, OF WASHINGTON, DISTRICT OF COLUMBIA, ASSIGNOR TO AMERICAN LECITHIN CORPORATION, OF ATLANTA, GEORGIA, A CORPORATION OF DELAWARE

NONGUMMING GASOLINE AND MODE OF PREPARING SAME

No Drawing.  Application filed October 28, 1931. Serial No. 571,682.

As is well known, gasoline shows a tendency to form gums, when the said gasoline is stored for any appreciable period, whether exposed to light or not. This tendency is particularly pronounced in the case of gasolines which have been made by the cracking process, or the so-called "cracked gasoline". Many attempts have been made to remove or reduce the tendency of the gasoline to form gums, but the methods heretofore employed are not entirely satisfactory. Among the materials which have been added heretofore, with a greater or less degree of success are hydroquinone, di-phenyl guanidine and numerous others, those mentioned being among the most effective agents heretofore employed for the purpose.

In accordance with the present invention I have found that the gumming tendency of the gasoline can be substantially reduced, by the addition of a small amount of lecithin, for which purpose I have found that the lecithin produced from soybeans is entirely satisfactory. The quantity to be added can vary between rather wide limits, but in any event it is not necessary to add any large percentage, and various quantities between 0.01% and 0.15% can be satisfactorily used. Gasoline to which such quantities of lecithin have been added, are found to have a very much reduced tendency to the formation of gums, and in many cases the addition of quantities approaching 0.1% will be sufficient to entirely prevent gum formation within a period of a week or more, in the presence of cataylsts, and saturated with oxygen.

For the purpose of determination of the amount of gum in gasoline, I have now proposed the following test:—

5 c. c. of the suspected gasoline are mixed (in an oil tube) with 20 c. c. of 5% acidified alcoholic potassium iodide solution. Tightly corked, this solution is kept in the dark for exactly 5 minutes. At the end of this time, 20 c. c. of water and a few drops of starch solution are added. If any gum is present, the starch solution will react with the liberated iodine and impart the characteristic starch-iodide color to the solution. This solution is now titrated against N/500 $Na_2S_2O_3$ reagent. The number of c. c. of N/500 $Na_2S_2O_3$ necessary to react with the liberated iodine to a colorless end-point divided by c. c. of gasoline taken as a sample gives what may be termed a "gum-index".

With this test as a guide to determine the gum content of the experimental gasolines, the following type of experiment was carried out to test the value of small quantities of "lecithin", compared with di-phenyl guanidine, potassium cyanide and hydroquinone, as an anti-gumming agent.

100 c. c. of gum free gasoline was placed in each one of a series of Erlenmeyer flasks. As a catalyst was added in each instance 0.005 mgm. cobaltic oleate dissolved in chloroform. The anti-gumming agents, namely lecithin, potassium cyanide, hydroquinone and di-phenyl guanidine were each added in 100, 50, 25 and 12 mgm. amounts. Two blanks were run in each experiment, the same amount of catalyst, with no anti-gumming agent being added to 100 c. c. gum free gasoline. Oxygen was added to each flask, the flask being shaken with oxygen and then the flasks were tightly corked and held in the dark at 26° C. At ten hour intervals the titration test was made on a sample of each gasoline.

The results after 70 hours standing, are as follows, in the case of adding 100 mgm. of the inhibitors:—

(1) The lecithin sample remained gum-free for 70 hours at which time the other treated gasolines showed these respective gum-ratios:—

Hydroquinone _____ 0.920
Potassium cyanide _____ 0.970
Di-phenyl guanidine _____ 1.320
Blank _____ 1.900

(2) The ratios for the 50, 25 and 12 mgm. tests were higher than for the 100 mgm. test, but the "lecithin samples" in all cases showed the lowest "gum-ratios".

These tests were repeated and the results conclusively showed that lecithin in amounts from 12 to 100 mgm. per 100 c. c. of gasoline was superior to the other anti-gumming agents tried.

Further, tests made by the common method of oxygen absorption and the Ethyl Gasoline Corp. "bomb test" all show lecithin to possess distinct anti-gumming properties.

In connection with the above experiments, and quantities as stated in this specification, I note the following. These quantities are based upon the use of purified lecithin, substantially free from extraneous oil. Tests have been made by me, in which a concentrate of lecithin, containing about 60% of lecithin mixed with 40% of vegetable oil was used (for example a mixture containing 60 parts of soybean lecithin and 40 parts of soybean oil), and entirely satisfactory results were produced by the use of such material. However it is entirely within the scope of the invention to remove the oil from such mixtures, and to then dissolve the lecithin in gasoline, as a relatively concentrated solution, say 30% to 60%, and to thereafter add a portion of this solution which will give the required amount of lecithin to a large volume of gasoline. For ordinary purposes I prefer to use lecithin in the amount of about 0.01 up to .02%, based on the amount of the gasoline, which will be entirely sufficient to prevent any substantial amount of gum formation for several months.

Instead of using the purified lecithin the crude phosphatides as obtained from various vegetable or animal matters such as soybeans, or from other sources, can be added to the gasoline. The phosphatides can first be purified from any amount of free fatty oils which they contain, although this step is not entirely necessary. Ordinarily it would be regarded as inadvisable to add any great amount of free fatty oils with the lecithin or phosphatides, to the gasoline, since fatty oils would have a tendency to the formation of a somewhat gummy material in the carbureters or pipe systems of the automobile.

Preferably I add as small an amount of the lecithin or phosphatides to the gasoline as would be capable of preventing gum formation, for the reason that these materials, and also fatty oil accompanying the same, which is added to the gasoline would itself be indicated as gummy material when the gasoline is analyzed for gum content, by most of the commonly used methods.

It is my belief that the formation of gums in gasoline is caused, to some extent at least, by metal compounds in the gasoline, and it is my belief that the said metal compounds constitute gum-forming catalyzers, and that the lecithin acts upon these metal compounds to render the same catalytically non-active, or in other words to poison the catalysts which form gum.

Of course it will be understood that in the tests given above the presence of oxygen as well as the presence of the added cobaltic oleate, were for the purpose of very greatly accelerating gum formation from the gum forming constituents of the gasoline, so that on standing for 70 hours under the test conditions, there would be as much gum formed from the gum forming constituents of the gasoline in question, as would be formed under normal storage conditions for many weeks or even months, so that when this gasoline stood for 70 hours under the test conditions, that was the equivalent of standing under ordinary service conditions for a long period.

It will be understood that the term "lecithin" as used herein, and as commonly used herein, is intended to cover a mixture of lecithin and cephalin, as these ordinarily occur. Either could be used alone, with equally good results. The term "phosphatides" is intended to embrace cephalin and related compounds.

I claim:—

1. As a new product, gasoline containing a few thousandths to a few hundredths of one per cent of added phosphatide, such product having not more than a slight tendency to formation of gum.

2. As a new product, cracked gasoline containing a few thousandths to a few hundredths of one per cent of added phosphatide, such product having not more than a slight tendency to formation of gum.

3. As a new product, gasoline containing about 0.01% to 0.15% of added phosphatide, such product having not more than a slight tendency to formation of gum.

4. As a new product, gasoline containing about 0.012% to 0.1% of added phosphatide, such product having not more than a slight tendency to formation of gum.

5. As a new product, gasoline containing a few thousandths to a few hundredths of one per cent of added phosphatides, such product having not more than a slight tendency to formation of gum, said product being substantially free from fatty oil.

6. As a new product, gasoline containing a few thousandths to a few hundredths of one per cent of added lecithin, such product having not more than a slight tendency to formation of gum.

7. As a new product, gasoline containing about 0.01% to 0.15% of added lecithin, such product having not more than a slight tendency to formation of gum.

8. A process which comprises adding a small fraction of one per cent of a phosphatide to a gasoline which normally would have a tendency to gum-formation, whereby said tendency is reduced.

9. A process which comprises adding a small fraction of one per cent of lecithin to a gasoline which normally would have a tendency to gum-formation, whereby said tendency is reduced.

10. A process which comprises adding a small fraction of one per cent of vegetable lecithin containing not more than a very small amount of fatty oil, to a gasoline which normally would have a tendency to gum-formation, whereby said tendency is reduced.

In testimony whereof I affix my signature.

EVERETTE I. SOLLMANN.